United States Patent [19]

Breuer et al.

[11] 3,862,941

[45] *Jan. 28, 1975

[54] 2-(THIOCARBONYLAMINO)ACETAMIDO-CEPHALOSPORANIC ACID COMPOUNDS

[75] Inventors: Herman Breuer, Burgweinting; Uwe Treuner, Regensburg, both of Germany

[73] Assignee: E. R. Squibb & Sons, Inc., Princeton, N.J.

[*] Notice: The portion of the term of this patent subsequent to Dec. 17, 1991, has been disclaimed.

[22] Filed: Nov. 4, 1971

[21] Appl. No.: 195,807

[52] U.S. Cl. .................. 260/243 C, 424/246
[51] Int. Cl. .................. C07d 99/24
[58] Field of Search .................. 260/243 C

[56] References Cited
UNITED STATES PATENTS

| | | | |
|---|---|---|---|
| 3,591,585 | 7/1971 | Hatfield | 260/243 C |
| 3,673,183 | 6/1972 | Erickson | 260/243 C |
| 3,708,479 | 1/1973 | Welch et al. | 260/243 C |

Primary Examiner—Nicholas S. Rizzo
Attorney, Agent, or Firm—Lawrence S. Levinson; Merle J. Smith

[57] ABSTRACT

New 2-(thiocarbonylamino)acetamidocephalosporanic acid compounds of the following general formula, and their salts,

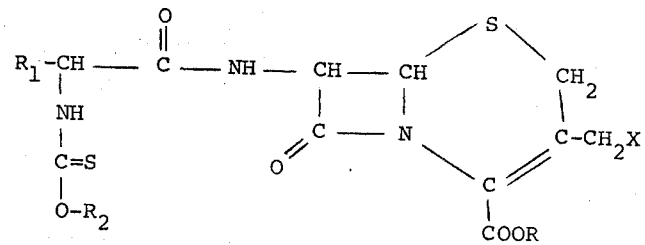

wherein R is hydrogen, lower alkyl, aralkyl, a salt forming ion or the group

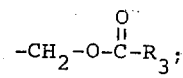

$R_1$ is hydrogen, lower alkyl, lower alkenyl, cyclo-lower alkyl, unsaturated cyclo-lower alkyl, aryl, aralkyl or a heterocyclic group; $R_2$ is lower alkyl, lower alkoxy-lower alkyl, lower alkylthio-lower alkyl, aryl, aralkyl or a heterocyclic group, $R_3$ is lower alkyl, aryl or aralkyl and X is hydrogen, hydroxy, lower alkanoyloxy, aroyloxy, aralkanoyloxy, the radical of a nitrogen base, a quaternary ammonium radical or together X and R represent a bond linking carbon and oxygen in a lactone ring; are useful as antibacterial agents.

9 Claims, No Drawings

2-(THIOCARBONYLAMINO)ACETAMIDOCEPH-ALOSPORANIC ACID COMPOUNDS

SUMMARY OF THE INVENTION

This invention relates to new antibacterial α-thio carbonylamino cephalosporanic acid compounds of the formula (I)
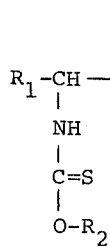 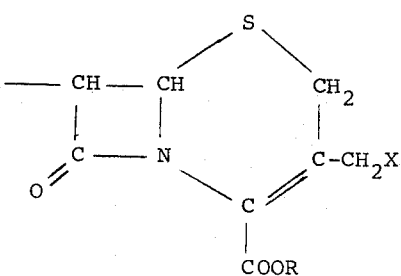

R represents hydrogen, lower alkyl, aralkyl, a salt forming ion or the group

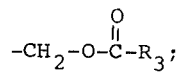

$R_1$ represents hydrogen, lower alkyl, lower alkenyl, cycloalkyl, unsaturated cycloalkyl, aryl, aralkyl or a heterocyclic group; $R_2$ represents lower alkyl, lower alkoxy-lower alkyl, lower alkylthio-lower alkyl, amino-lower alkyl, aryl, aralkyl or a heterocyclic group; $R_3$ represents lower alkyl, aryl or aralkyl; X is hydrogen, hydroxy, lower alkanoyloxy, aroyloxy, aralkanoyloxy, the radical of a nitrogen base or a quaternary ammonium radical. In addition X and R may represent a bond linking carbon and oxygen in a lactone ring.

The preferred members within each group are as follows: R is hydrogen, lower alkyl or alkali metal, especially hydrogen, methyl, pivaloyloxymethyl, sodium or potassium; $R_1$ is phenyl, 1,4-cyclohexadienyl, pyridyl, pyrrolidyl, morpholino, thienyl, furyl, oxazolyl, isoxazolyl, thiazolyl, especially phenyl and most especially 1,4-cyclohexadienyl; $R_2$ is phenyl or lower alkyl, especially methyl or ethyl; $R_3$ is lower alkyl, preferably methyl or t-butyl.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like. The lower alkenyl groups are monounsaturated hydrocarbon radicals of the same type, the two to four carbon members being preferred.

The lower alkoxy and lower alkylthio groups are ether groups containing a lower alkyl group, such as those illustrated, attached to an oxygen or sulfur, e.g., methoxy, ethoxy, propoxy, isopropoxy, methylthio, ethylthio, propylthio, isopropylthio or the like.

Cycloalkyl groups include cycloaliphatic groups having 3 to 7 carbons in the ring such as cyclopropyl, cyclobutyl, cyclohexyl and cycloheptyl. The cyclic groups may also be cycloalkenyl and cycloalkadienyl groups of the same type, e.g., cyclobutenyl, cyclopentenyl, cyclohexenyl, cyclopentadienyl, cyclohexadienyl, etc. The double bond or bonds may be variously located. A particularly preferred radical, as discussed later is the 1,4-cyclohexadienyl group. These may be simply substituted with one to three groups such as halogen, lower alkyl or lower alkoxy.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, hydroxy, lower alkanoyl or lower alkanoyloxy. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl and p-hydroxyphenyl.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The lower alkanoyloxy, aroyloxy and aralkanoyloxy groups include the acyl group of acid esters. The lower alkanoyl radicals are the acyl radicals of the lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described.

X, in addition to the ester groups referred to above, also represents the radical of an amine, e.g., an alkylamine like methylamine, ethylamine, dimethylamine, triethylamine, aralkylamine like dibenzylamine, pyridinium, 1-quinolinium, 1-picolinium, etc., X and R may also join together, as indicated above to form a bond linking carbon and oxygen in a lactone ring.

The heterocyclic groups represented by $R_1$ and $R_2$ are 5 to 6-membered monocyclic heterocyclic radicals (exclusive of hydrogen) containing nitrogen, sulfur or oxygen in the ring in addition to carbon (not more than two hetero atoms), and members of this group simply substituted as discussed above with respect to the aryl groups. The heterocyclic radicals include, for example, pyridyl, pyrrolidyl, morpholinyl, thienyl, furyl, oxazolyl, isoxazolyl, thiazolyl and the like, as well as the simply substituted members, especially the halo, lower alkyl (particularly methyl and ethyl), lower alkoxy (particularly methoxy and ethoxy), phenyl and hydroxy-lower allkyl (particularly hydroxymethyl and hydroxyethyl) substituted members.

The salt forming ions may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

Preferred groups of compounds are those having the formulas (II)
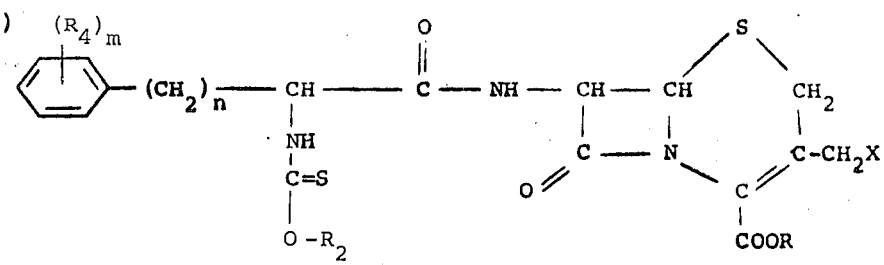

(III)
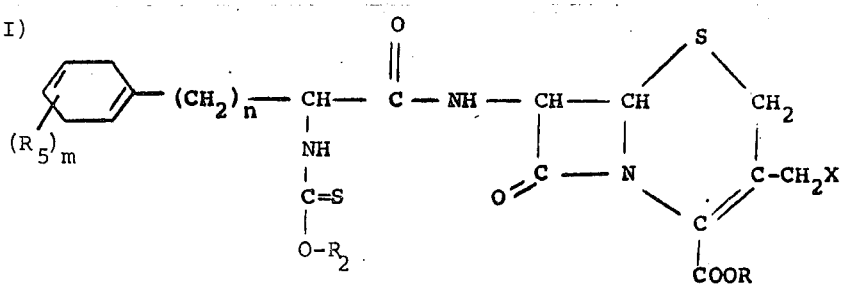

(IV)
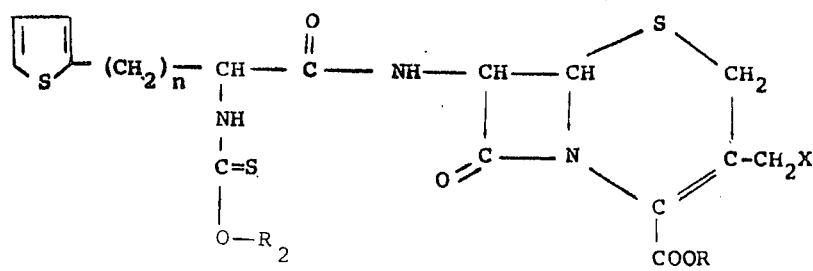

R and X have the same meaning described above but especially X is hydrogen or acetoxy, and R is hydrogen or sodium.

$R_4$ is hydrogen or a hydroxy, halogen, lower alkyl, lower alkoxy, lower alkanoyl or lower alkanoyloxy group such as those described above. $R_5$ is hydrogen, lower akyl or lower alkoxy. m is 1, 2 or 3 and n is 0, 1, 2, 3 or 4. Most preferred are those compounds wherein $R_4$ and $R_5$ each is hydrogen, especially when n is 0. $R_2$ is lower alkyl and phenyl.

The compounds of formula I are produced by reacting a compound of the formula (V)
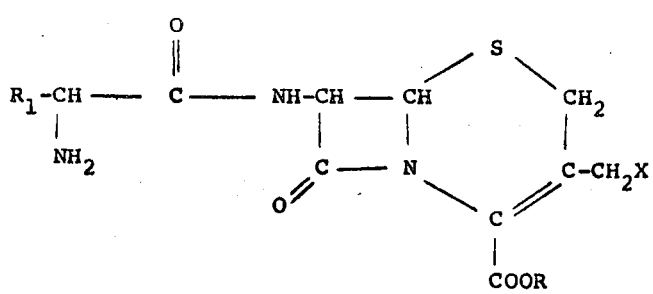

with an O-ester of a halothioformic acid of the formula (VI)
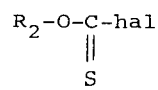

wherein hal is halogen, preferably chlorine, in an aqueous medium, in the presence of a base like sodium hydroxide or triethylamine.

Alternatively, a compound of formula V may be treated with a thiocarbonylthioacetic acid of the formula (VII)
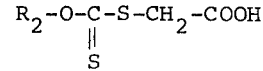

in a solvent such as methylene chloride, preferably in the presence of a tertiary amine such as triethylamine.

As a further alternative, a compound of the formula (VIII) 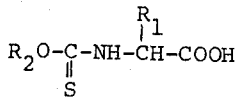

or an activated derivative thereof, may be made to react with a 7-aminocephalosporanic acid compound of the formula (IX) 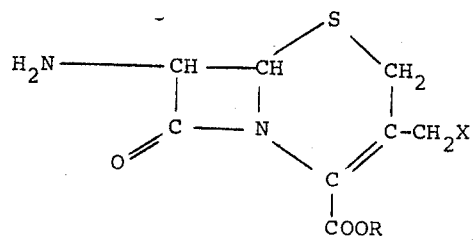

under the conditions described above.

When R is the acyloxymethyl group

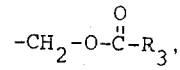

this group may be introduced onto the 7-aminocephalosporanic acid moiety either prior to or subsequent to the reaction with the compound of formula VI or formula VII by treatment with one to two moles of a halomethyl ester of the formula (X)

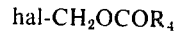

wherein hal is halogen, preferably chlorine or bromine, in an inert organic solvent such as dimethylformamide, acetone, dioxane, benzene or the like at about ambient temperature or below.

The starting materials of formulas VI, VII and VIII are well known and readily accessible by the following general procedures:

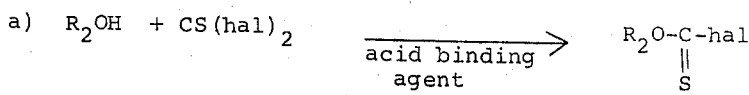

(VI)

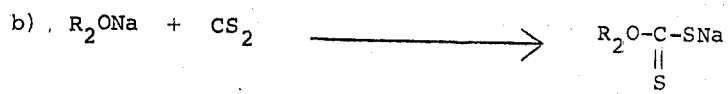

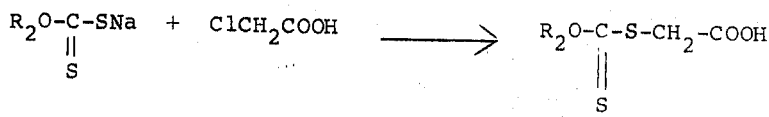

(VII)

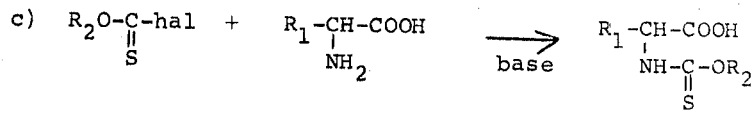

(VIII)

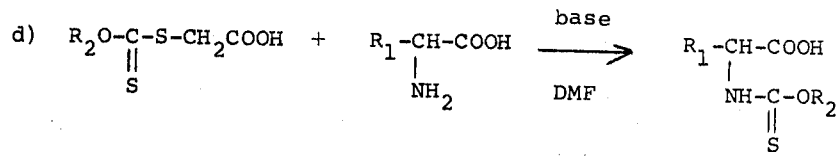

(VIII)

The products of this invention form salts which are also part of the invention. Basic salts form with the acid moiety as discussed above when the symbol R is hydrogen.

It will be appreciated that certain of the compounds of this invention exist in various states of solvation as well as in different isomeric or optically active forms. The various forms as well as their mixtures are within the scope of this invention.

Ordinarily the new compounds of this invention having the D-form are more active than the corresponding compounds having the L-form or DL-form.

Further process details are provided in the illustrative examples.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg./kg., daily, orally or parenterally, in single or 2 to 4 divided doses to treat infections of bacterial origin, e.g., 5.0 mg./kg. in mice.

Oral forms give prompt high blood levels which are maintained for relatively long periods.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, elg., for cleaning barns or dairy equipment, at a concentration of about 0.1 to 1 percent by weight of such compounds admixed with, suspended or dissolved in conventional inert dry or aqueous carriers for application by washing or spraying.

They are also useful as nutritional supplements in animal feeds.

The following examples are illustrative of the invention. All temperatures are on the centigrade scale. Additional variations may be produced in the same manner by appropriate substitution in the starting material.

EXAMPLE 1

7-[D-2-[(phenoxythiocarbonyl)amino]-2-(1,4-cyclohexadien-1-yl)acetamido]-3-desacetoxycephalosporanic acid and potassium salt 1.85 g. of 7-[D-2-amino-2-(1,4-cyclohexadien-1-yl)acetamido]-3-desacetoxycephalosporanic acid are suspended in 25 ml. of water at room temperature and brought into solution by the addition of 0.75 ml. of triethylamine. 25 ml. of acetone are added and the solution is cooled to 5°–10°. A solution of 0.95 g. of chloroformic acid-O-phenyl ester is added dropwise with stirring at this temperature and the pH is maintained within the range of 8.0 – 8.2 by the simultaneous addition of triethylamine. The solution is stirred for an additional 40 minutes and then diluted with 150 ml. of water. The solution is layered over with ethyl acetate and acidified to pH2 with 2N hydrochloric acid, the temperature being maintained at about 5°.

The layers are separated and the aqueous layer is shaken several times with ethyl acetate. The combined ethyl acetate extracts are washed twice with a little water, dried with anhydrous magnesium sulfate, filtered and concentrated in a rotary evaporator.

The oily residue is triturated with petroleum ether until it becomes solid and then filtered under suction. This crude product is purified by treatment with ethyl ether and filtered from the insoluble portions. Upon concentration of the filtrate, crystals form which are filtered under suction. The product, 7-[D-2-[(phenoxythiocarbonyl)amino]-2-(1,4-cyclohexadien-1-yl)-acetamido]-3-desacetoxycephalosporanic acid, 1.2 g., begins to melt at 120° (with dec.). This is dissolved in a little ethyl acetate and treated with 1.2 mol. of a 2N solution of potassium ethyl hexanoate in n-butanol. Upon the addition of ether, the potassium salt of 7-[D-2-[(phenoxythiocarbonyl)amino]-2-(1,4-cyclohexadien-1-yl)acetamido]-3-desacetoxycephalosporanic acid precipitates. The product, which in the atmosphere takes up 2 mols. of water of crystallization, melts at 100° (with dec.).

EXAMPLE 2

7-[D-2-[(ethoxythiocarbonyl)amino]-2-(1,4-cyclohexadien-1-yl)acetamido]-3-desacetoxycephalosporanic acid and potassium salt 1.85 g. (0.005 mol.) of 7-[D-2-amino-2-(1,4-cyclohexadien-1-yl)acetamido]-3-desacetoxycephalosporanic acid, 2.7 g. (0.015 mol.) of [(ethoxythiocarbonyl)thio]acetic acid and 3.5 g. (0.035 mol.) of triethylamine in 100 ml. of methylene chloride are stirred for 20 hours at room temperature. The reaction mixture is concentrated in a rotary evaporator, the residue is dissolved in water, layered over with ethyl acetate, cooled to 0°–10° and acidified with 2N hydrochloric acid to pH 2. The ethyl acetate layer is separated and washed twice with water. This is dried with magnesium sulfate and the ethyl acetate is then removed in a rotary evaporator.

The residue is taken up with a little ethyl acetate, filtered and the filtrate is treated with about 600 ml. of petroleum ether. The precipitate is filtered off and again precipitated in the same way. 1.3 g. of 7-[D-2-[(ethoxythiocarbonyl)amino]-2-(1,4-cyclohexadien-1-yl)acetamido]-3-desacetoxycephalosporanic acid are obtained, which are dissolved in methanol and treated with 3 ml. of a 2N solution of potassium ethylhexanoate in butanol. Upon the addition of ether, the potassium salt of the foregoing compound precipitates. 1.3 g. of this potassium salt are obtained which takes up 2 mols. of water of crystallization upon exposure to air. The product, free of the water of crystallization, melts at 200° (dec.).

EXAMPLE 3

7-[D-2-[(methoxythiocarbonyl]-2-(1,4-cyclohexadien-1-yl)acetamido]-3-desacetoxycephalosporanic acid and the potassium salt are obtained by the procedure of Example 2 by substituting [(methoxythiocarbonyl)thio]acetic acid for the [(ethoxythiocarbonyl)-thio]acetic acid.

EXAMPLE 4

7-[D-2-[(phenoxythiocarbonyl)amino]-2-(1,4-cyclohexadien-1-yl)acetamido]cephalosporanic acid is obtained by the procedure of Example 1 by substituting 0.005 mol. of 7-[D-2-amino-2-(1,4-cyclohexadien-1-yl)acetamido]cephalosporanic acid as the starting material.

EXAMPLE 5

7-[D-2-[(ethoxythiocarbonyl)amino]-2-(1,4-cyclohexadien-1-yl)acetamido]cephalosporanic acid is obtained by the procedure of Example 2 by substituting 0.005 mol. of 7-[D-2-amino-2-(1,4-cyclohexadien-1-yl)acetamido]cephalosporanic acid as starting material.

EXAMPLE 6

7-[D-2-[(phenoxythiocarbonyl)amino]-2-phenylacetamido]-3-desacetoxycephalosporanic acid is obtained by the procedure of Example 1 by substituting 0.005 mol. of 7-(D-2-amino-2-phenylacetamido)-3-desacetoxycephalosporanic acid as the starting material.

EXAMPLE 7

7-[D-2-[(ethoxythiocarbonyl)amino]-2-phenylacetamido]-cephalosporanic acid is obtained by the procedure of Example 2 by substituting 0.005 mol. of 7-(D-2-amino-2-phenylacetamido)-cephalosporanic acid as the starting material.

EXAMPLE 8

7-[D-2-[(phenoxythiocarbonyl)amino]-3-phenylpropionamido]-3-desacetoxycephalosporanic acid is obtained by the procedure of Example 1 by substituting 0.005 mol. of 7-[D-2-amino-3-phenylpropionamido]-3-desacetoxycephalosporanic acid as the starting material.

EXAMPLE 9

7-[D-2-[(ethoxythiocarbonyl)amino]-3-(1,4-cyclohexadien-1yl)propionamido]cephalosporanic acid is obtained by the procedure of Example 2 by substituting 0.005 mol. of 7-[D-2-amino-3-(1,4-cyclohexadien-1-yl)propionamido]cephalosporanic acid as starting material.

EXAMPLE 10

7-[D-2-[(allyloxythiocarbonyl)amino]-2-phenylacetamido]-3-desacetoxycephalosporanic acid is obtained by the procedure of Example 2 by substituting equivalent amounts of 7-[D-2-amino-2-phenylacetamido]-3-desacetoxycephalosporanic acid and [(allyloxythiocarbonyl)thio]acetic acid as starting materials.

EXAMPLE 11

7-[D-2-[(ethoxythiocarbonyl)amino]-2-(4-methoxy-1,4-cyclohexadien-1-yl)acetamido]-3-desacetoxycephalosporanic acid is obtained by the procedure of Example 2 by substituting 0.005 mol. of 7-[D-2-amino-2-(4-methoxy-1,4-cyclohexadien-1yl)acetamido]-3-desacetoxycephalosporanic acid as starting material.

The following additional products having the formula in Column B of the following table are obtained according to the procedure of Example 2 by substituting for the [(ethoxythiocarbonyl)thio]acetic acid the acid shown in Column A of the table and utilizing the 7-ADCA of Example 2 or substituting for it the appropriate 7-aminocephalosporanic acid or 7-amino-3-desacetoxycephalosporanic acid:

TABLE I

A

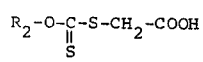

B

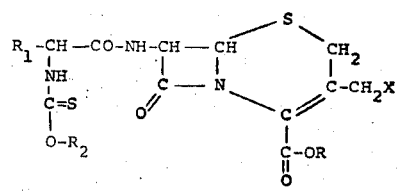

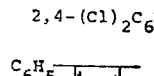

| Example | $R_2$ | R | $R_1$ | $R_2$ | X |
|---|---|---|---|---|---|
| 12 | $CH_3$ | $CH_3$ | H | $CH_3$ | H |
| 13 | $C_2H_5$ | H | $C_3H_7$ | $C_2H_5$ | pyridinium |
| 14 | $C_6H_5CH_2-$ | $-CH_2O\overset{O}{\overset{\|}{C}}-CH(CH_3)_2$ | $C_6H_5CH_2$ | $C_6H_5CH_2-$ | $OCOCH_3$ |
| 15 | $C_2H_5$ | $-CH_2O\overset{O}{\overset{\|}{C}}-C_6H_5$ | $4-ClC_6H_4-$ | $C_2H_5$ | $OCHOCH_3$ |
| 16 | $C_2H_5$ | H | $3,4-(CH_3O)_2C_6H_3-$ | $C_2H_5$ | H |
| 17 | $C_2H_5$ | H | $3,4,5-(CH_3O)_3C_6H_2-$ | $C_2H_5$ | $OCOCH_3$ |
| 18 | $CH_3$ | $C_2H_5$ | $2,4-(Cl)_2C_6H_3-$ | $CH_3$ | $OCOCH_3$ |
| 19 | $C_2H_5$ | $C_2H_5$ | $\underset{N_{\diagdown O}\diagup\overset{\|}{C}H_3}{\overset{C_6H_5}{\|}}$ | $C_2H_5$ | $OCOCH_3$ |

Table I—Continued

| | A | | B | | |
|---|---|---|---|---|---|
| Example | $R_2$ | R | $R_1$ | $R_2$ | X |
| 20 | $C_2H_5$ | $C_2H_5$ | morpholino- | $C_2H_5$ | $OCOCH_3$ |
| 21 | $C_2H_5$ | $C_2H_5$ | 3-methylpyridyl- | $C_2H_5$ | $OCOCH_3$ |
| 22 | $C_2H_5$ | $C_2H_5$ | thienyl- | $C_2H_5$ | $OCOCH_3$ |
| 23 | thienyl | $-CH_2OC(O)-CH(CH_3)_2$ | $C_6H_5-$ | thienyl | H |
| 24 | $C_2H_5$ | H | $CH_3CH_2-CH-$ | $C_2H_5$ | H |
| 25 | $CH_2CH_2OC_2H_5$ | Na | $C_6H_5-$ | $CH_2CH_2OC_2H_5$ | H |
| 26 | $CH_3$ | $CH_2O-C(O)-CH(CH_3)_2$ | $C_6H_5-$ | $CH_3$ | $-OCOCH_3$ |
| 27 | $-CH_2OCH_3$ | K | thienyl | $-CH_2OCH_3$ | H |
| 28 | $CH_2SC_2H_5$ | K | $C_6H_5-$ | $CH_2SC_2H_5$ | $OCOCH_3$ |
| 29 | $C_2H_5$ | H | thienyl | $C_2H_5$ | H |

The following additional products having the formula in Column B of the following table are obtained according to the procedure of Example 1 by substituting for the chloroformic acid-O-phenyl ester the starting material in Column A and utilizing the appropriately substituted compound of formula V:

TABLE II

A $$R_2-O-\underset{\underset{S}{\|}}{C}-Cl$$

B

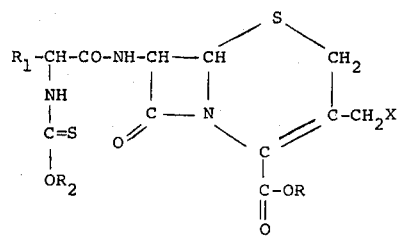

| Example | $R_2$ | R | $R_1$ | $R_2$ | X |
|---|---|---|---|---|---|
| 30 | $C_6H_5$ | H | $4-CH_3C_6H_4-$ | $C_6H_5$ | $-OCOCH_3$ |
| 31 | $C_6H_5$ | lactone (+X) | $3,4-(Br)_2C_6H_3CH_2-$ | $C_6H_5$ | lactone (+R) |
| 32 | $C_6H_5CH_2-$ | $C_6H_5CH_2-$ | furyl | $C_6H_5CH_2-$ | $-OOCH_2-C_6H_5$ |
| 33 | $C_6H_5$ | $-CH_2O-C(O)-CH(CH_3)_2$ | $C_6H_5-$ | $C_6H_5$ | $-OOCH_2-C_6H_5$ |
| 34 | $C_6H_5$ | H | $C_6H_5-$ | $C_6H_5$ | H |

EXAMPLE 35

A sterile powder for reconstitution for use intramuscularly is prepared from the following ingredients which supply 1000 vials each containing 250 mg. of active ingredient:

| | |
|---|---|
| [D-2-[(phenoxythiocarbonyl)-amino]-2-(1,4-cyclohexadien-1-yl)acetamido]-3-desacetoxy cephalosporanic acid, sterile | 250 gm. |
| Lecithin powder, sterile | 50 gm. |
| Sodium carboxymethylcellulose, sterile | 20 gm. |

The sterile powders are aseptically blended and filled into sterile vials, and sealed. The addition of 1 ml. of water for injection to the vial provides a suspension for intramuscular injection.

What is claimed is:
1. A compound of the formula

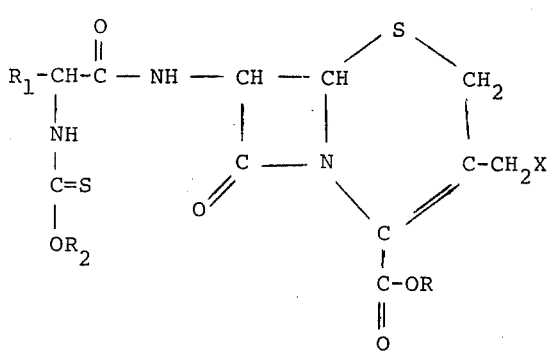

wherein R is hydrogen, lower alkyl $$-CH_2-O-\overset{\overset{O}{\|}}{C}-R_3,$$

alkali metal, alkaline earth metal or triethylamine; $R_1$ is hydrogen, lower alkyl, allyl, cyclopentyl, cyclohexyl, cyclohexadienyl, $R_4$-phenyl or thienyl; $R_2$ is lower alkyl, phenyl, phenyl-lower alkyl or thienyl; $R_3$ is lower alkyl or phenyl; $R_4$ is hydrogen, halo or lower alkoxy; and X is hydrogen, hydroxy or lower alkanoyloxy.

2. A compound of the formula

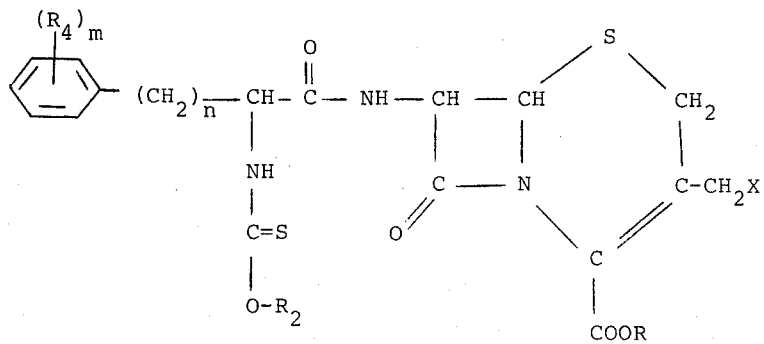

wherein R, $R_2$, $R_4$ and X are as defined in claim 1; $m$ is 1, 2 or 3; and $n$ is 0, 1, 2, 3 or 4.

3. A compound of the formula

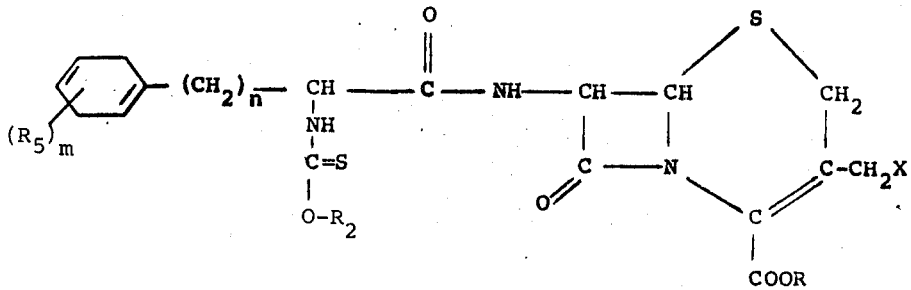

wherein X, R and $R_2$ are as defined in claim 1, $R_5$ is hydrogen, lower alkyl or lower alkoxy, $m$ is 1, 2 or 3 and $n$ is 0, 1, 2, 3 or 4.

4. A compound as in claim 3 wherein R, $R_5$ and X each is hydrogen, $R_2$ is phenyl, $m$ is 1 and $n$ is 0.

5. A compound as in claim 3 wherein R, $R_5$ and X each is hydrogen, $R_2$ is ethyl, $m$ is 1 and $n$ is 0.

6. A compound as in claim 3 wherein R and $R_5$ each is hydrogen, $R_2$ is phenyl, X is acetoxy, $m$ is 1 and $n$ is 0.

7. A compound as in claim 3 wherein R and $R_5$ each is hydrogen, $R_2$ is ethyl, X is acetoxy, $m$ is 1 and $n$ is 0.

8. A compound as in claim 2 wherein R, $R_4$ and X each is hydrogen, $R_2$ is phenyl, $m$ is 1 and $n$ is 0.

9. A compound as in claim 2 wherein R and $R_4$ each is hydrogen, $R_2$ is ethyl, X is acetoxy, $m$ is 1 and $n$ is 0.

* * * * *